US009426334B1

United States Patent
Takaishi et al.

(10) Patent No.: US 9,426,334 B1
(45) Date of Patent: Aug. 23, 2016

(54) DEVICE AND METHOD FOR DETERMINING APPROPRIATE COLOR PATCH MEASUREMENT OPERATION BY USER BASED ON ACQUIRED AND PREDICTED MEASUREMENT VALUES

(71) Applicant: FUJI XEROX CO., LTD., Tokyo (JP)

(72) Inventors: Shinya Takaishi, Kanagawa (JP); Shinsuke Sugi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/798,915

(22) Filed: Jul. 14, 2015

(30) Foreign Application Priority Data

Feb. 25, 2015 (JP) .................. 2015-035167

(51) Int. Cl.
| | |
|---|---|
| H04N 1/50 | (2006.01) |
| H04N 1/60 | (2006.01) |
| G06K 15/02 | (2006.01) |
| G06K 15/12 | (2006.01) |
| H04N 1/00 | (2006.01) |
| H04N 1/29 | (2006.01) |
| G06K 15/14 | (2006.01) |

(52) U.S. Cl.
CPC ............ *H04N 1/6033* (2013.01); *G06K 15/027* (2013.01); *G06K 15/129* (2013.01); *G06K 15/1878* (2013.01); *H04N 1/00023* (2013.01); *H04N 1/00034* (2013.01); *H04N 1/00045* (2013.01); *H04N 1/00082* (2013.01); *H04N 1/6008* (2013.01); *H04N 1/6027* (2013.01); *G06K 15/14* (2013.01); *H04N 1/00076* (2013.01); *H04N 1/29* (2013.01)

(58) Field of Classification Search
None
See application file for complete search history.

(56) References Cited

U.S. PATENT DOCUMENTS

| | | | | |
|---|---|---|---|---|
| 6,864,995 | B2 * | 3/2005 | Nogiwa .................. | G06K 15/02 347/19 |
| 7,542,168 | B2 * | 6/2009 | Goma ..................... | G03B 27/72 358/1.9 |
| 8,189,232 | B2 * | 5/2012 | Horita ................... | H04N 1/4078 358/1.9 |
| 8,189,244 | B2 * | 5/2012 | Fukuhara ........... | H04N 1/00015 358/406 |
| 8,958,125 | B2 * | 2/2015 | Hirano ................. | H04N 1/6027 359/1.9 |
| 9,013,754 | B1 * | 4/2015 | Sugi ........................ | H04N 1/46 358/1.9 |
| 2009/0213431 | A1 * | 8/2009 | Miyamoto ........... | G06K 15/102 358/3.03 |
| 2009/0225121 | A1 * | 9/2009 | Miyamoto ............. | B41J 2/2132 347/15 |

FOREIGN PATENT DOCUMENTS

| | | | |
|---|---|---|---|
| JP | 2005176032 A | * | 6/2005 |
| JP | 2005-269447 A | | 9/2005 |
| JP | 2010-263497 A | | 11/2010 |

\* cited by examiner

*Primary Examiner* — Scott A Rogers
(74) *Attorney, Agent, or Firm* — Oliff PLC

(57) ABSTRACT

A determination device includes a first instructing unit, a first acquiring unit, a correcting unit, a predicting unit, a second instructing unit, a second acquiring unit, and a determining unit. The predicting unit predicts a measurement value of a multicolor patch image included in a second patch column to be output by an image output device, the second patch column being acquired after the correcting unit corrects tone values in a first patch column. The second acquiring unit acquires the measurement value of the multicolor patch image measured by performing, by a user, an operation of a measurement device along the second patch column output by the image output device. The determining unit determines whether the operation performed by the user is appropriate on a basis of the measurement value acquired by the second acquiring unit and the measurement value predicted by the predicting unit.

5 Claims, 4 Drawing Sheets

FIG. 3
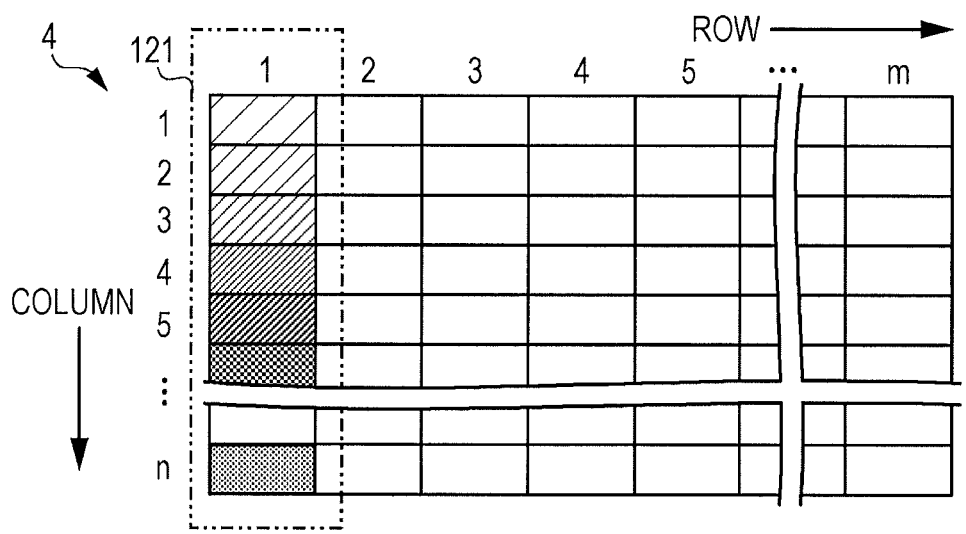
FIG. 4A
FIG. 4B
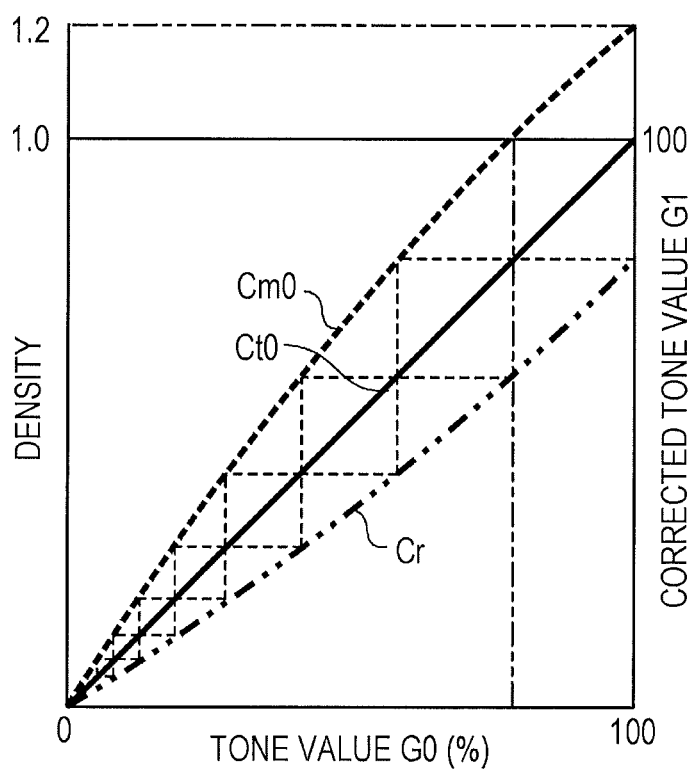

FIG. 5
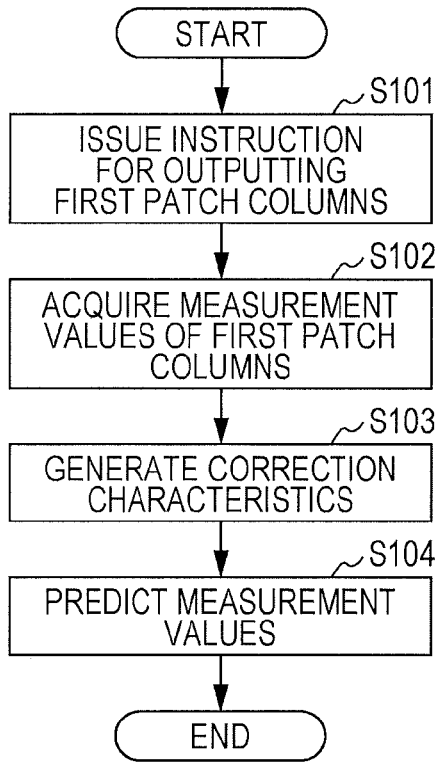
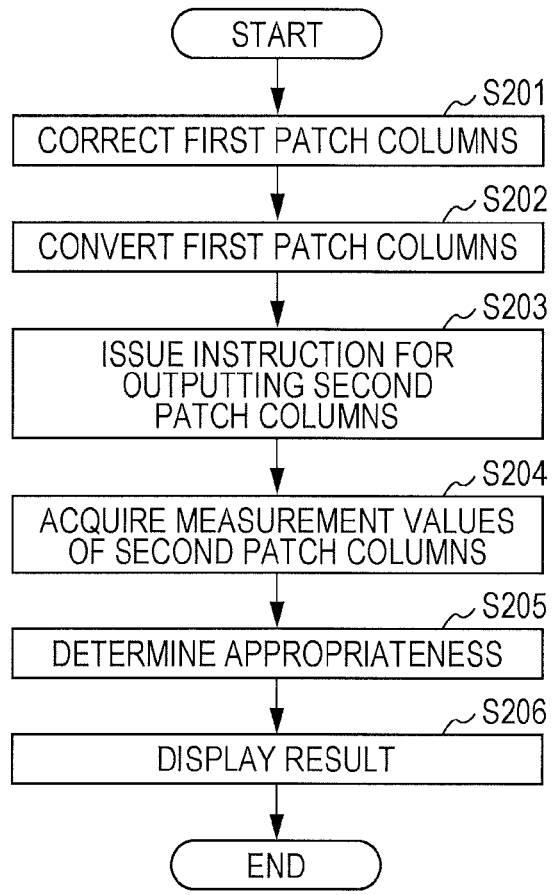
FIG. 6A
FIG. 6B

DEVICE AND METHOD FOR DETERMINING APPROPRIATE COLOR PATCH MEASUREMENT OPERATION BY USER BASED ON ACQUIRED AND PREDICTED MEASUREMENT VALUES

CROSS-REFERENCE TO RELATED APPLICATIONS

This application is based on and claims priority under 35 USC 119 from Japanese Patent Application No. 2015-035167 filed Feb. 25, 2015.

BACKGROUND

Technical Field

The present invention relates to a determination device and a determination method.

SUMMARY

According to an aspect of the invention, there is provided a determination device including a first instructing unit, a first acquiring unit, a correcting unit, a predicting unit, a second instructing unit, a second acquiring unit, and a determining unit. The first instructing unit instructs an image output device to output a first patch column in which multiple single-color patch images and at least one multicolor patch image are arranged, the multiple single-color patch images being represented by respective tone values for single colors, the one multicolor patch image being represented by a tone value of a multicolor. The first acquiring unit acquires measurement values of the multiple single-color patch images measured by a user by operating a measurement device along a first patch column output by the image output device. The correcting unit corrects the tone values on a per color basis such that the measurement values of the multiple single-color patch images acquired by the first acquiring unit are made to approach target values predetermined for the single-color patch images. The predicting unit predicts a measurement value of the multicolor patch image included in a second patch column to be output by the image output device, the second patch column being acquired after the correcting unit corrects the tone values in the first patch column. The second instructing unit instructs the image output device to output the second patch column. The second acquiring unit acquires the measurement value of the multicolor patch image measured by performing, by the user, an operation of the measurement device along the second patch column output by the image output device. The determining unit determines whether the operation performed by the user is appropriate on a basis of the measurement value acquired by the second acquiring unit and the measurement value predicted by the predicting unit.

BRIEF DESCRIPTION OF THE DRAWINGS

An exemplary embodiment of the present invention will be described in detail based on the following figures, wherein:

FIG. 3 is a diagram for explaining patch columns;

FIGS. 4A and 4B are a graph and a chart, respectively, for explaining correction characteristics;

FIG. 5 is a diagram for explaining a profile; and

FIGS. 6A and 6B are flowcharts each for explaining operation of the determination device.

DETAILED DESCRIPTION

1. Exemplary Embodiment 1-1. Overall Configuration of Image Forming System

Figure 1:
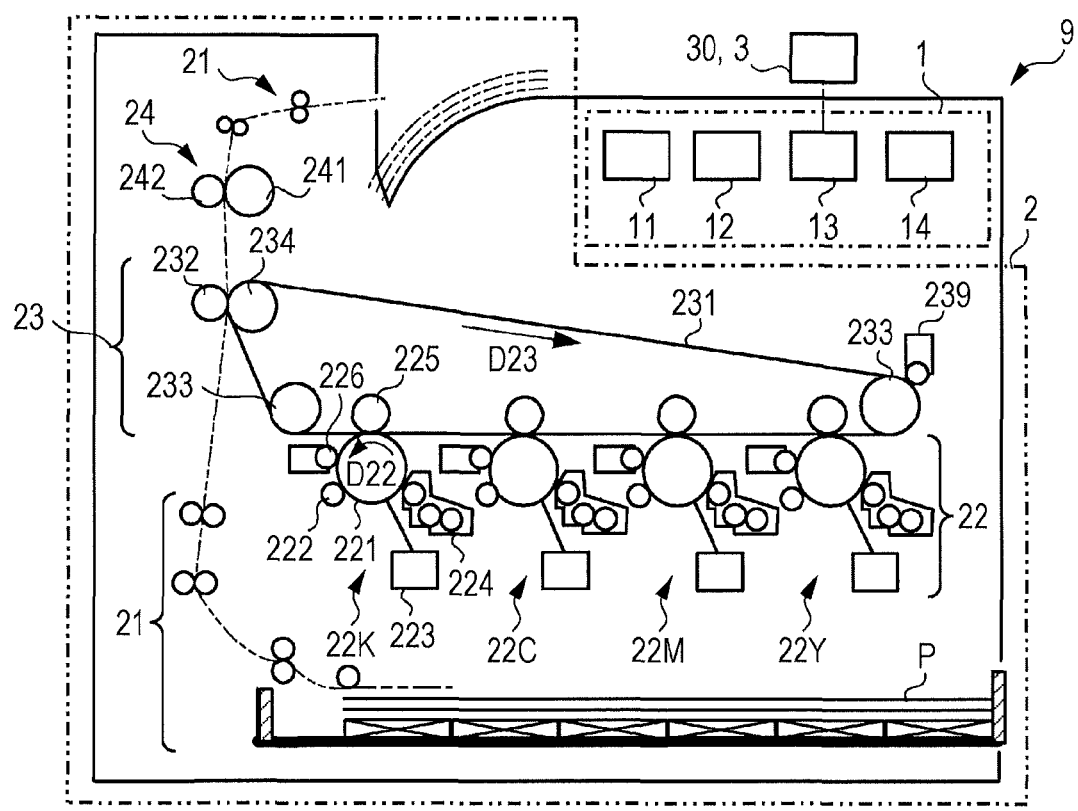
FIG. 1 is a diagram illustrating an overall configuration of an image forming system according to the present exemplary embodiment.

FIG. 1 is a diagram illustrating an overall configuration of an image forming system 9 according to the present exemplary embodiment. As illustrated in FIG. 1, the image forming system 9 includes a determination device 1 and an output device 2. The image forming system 9 may also include a measurement device 3 that measures images output by the output device 2.

The determination device 1 includes a controller 11, a memory 12, an operating unit 13, and a display 14 and further includes signal lines and other components, the signal lines being provided for transmitting control signals to the output device 2. The determination device 1 determines whether an operation performed by a user for correcting tone values of an image output by the output device 2 is appropriate. The determination device 1 has a function of instructing the output device 2 to output an image and a function of correcting data regarding the output image in response to the operation by the user.

The output device 2 includes a transporting unit 21, developing units 22C, 22M, 22Y, and 22K, a transfer unit 23, and a heating unit 24 and further includes an interface that receives the control signals transmitted from the determination device 1.

Note that reference letters C, M, Y, and K respectively denote structures for toner colors of cyan, magenta, yellow, and black. The developing units 22C, 22M, 22Y, and 22K use different toner but do not have largely different structures. Hereinafter, in a case where the developing units 22C, 22M, 22Y, and 22K do not particularly have to be distinguished from each other, the term "developing unit 22" is used without appending the letter indicating the color of the toner.

The controller 11 includes a central processing unit (CPU), a read only memory (ROM), and a random access memory (RAM) and controls the units of the image forming system 9 in such a manner that the CPU reads out and executes a computer program (hereinafter, simply referred to as a program) stored in the ROM or the memory 12.

The operating unit 13 includes operators such as operation buttons for various instructions. The operating unit 13 receives an operation performed by the user and provides the controller 11 with a signal in accordance with the operation. The operating unit 13 further includes an interface for receiving the data supplied from the measurement device 3.

Figure 2:
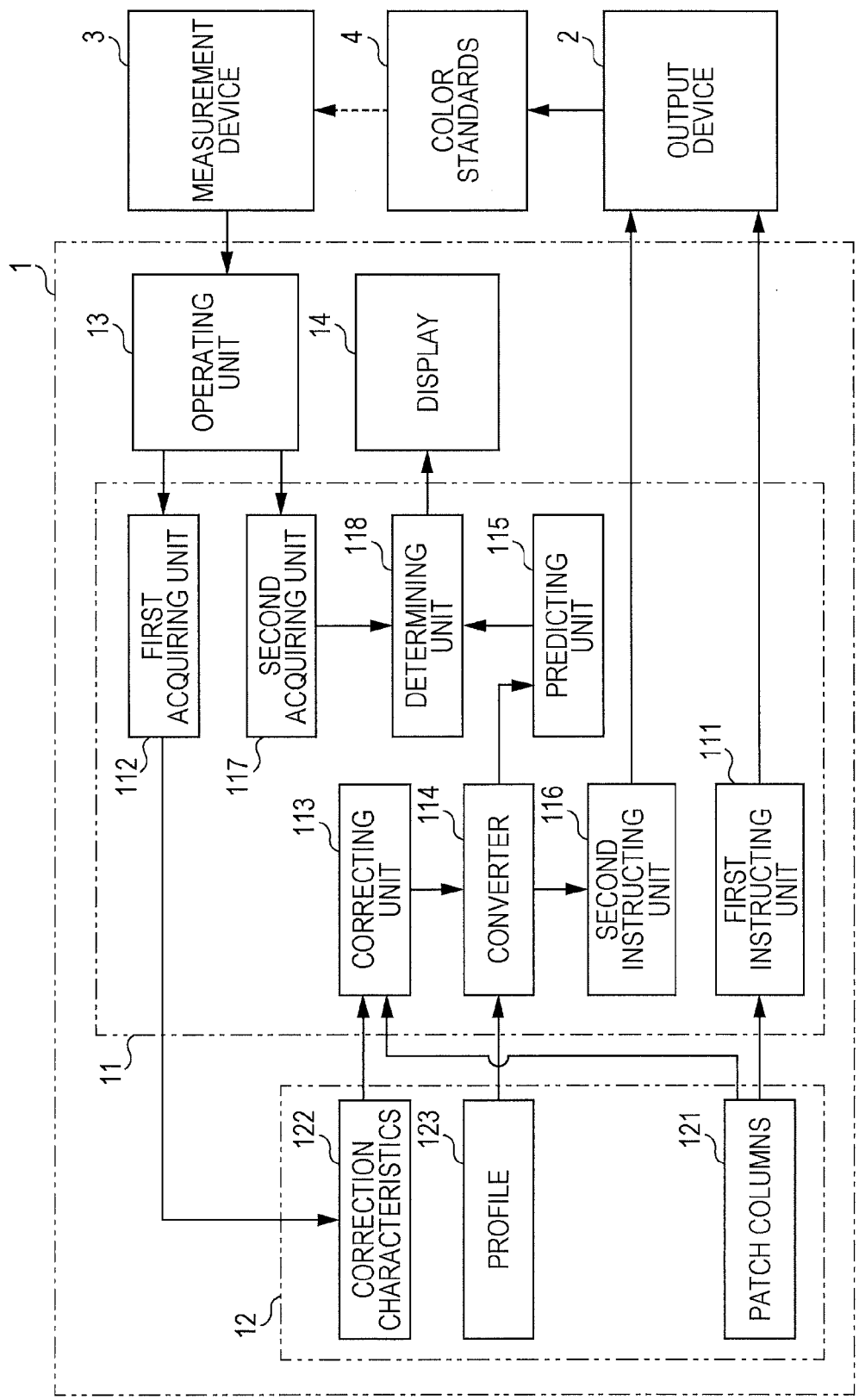
FIG. 2 is a diagram illustrating a functional configuration of a determination device of the image forming system.

The memory 12 is a bulk memory such as a hard disk drive and is used to store a program to be read by the CPU of the controller 11. The memory 12 is also used to store patch columns 121, correction characteristics 122, and a profile 123 that are illustrated in FIG. 2. Specific details of the data stored in the memory 12 will be described later.

The display 14 has a liquid crystal display and displays a result of a diagnosis performed by the controller 11, information stored in the memory 12, and the like. The display 14 may include a touch panel together with the operating unit 13.

The transporting unit 21 includes a container and transportation rollers. The container contains sheets of paper P (hereinafter, referred to as sheets P) cut in a predetermined size and serving as a medium. The sheets P contained in the container are taken out one by one by using the transportation rollers in accordance with an instruction from the controller 11 and are transported to the transfer unit 23 through a sheet transport path. Note that the medium is not limited to the paper sheets and may be, for example, resin sheets. In sum, as long as an image is recordable on the surface of an object, the object may be used as a medium.

Each developing unit 22 includes a photoconductor drum 221, a charger 222, an exposure device 223, a developing device 224, a first transfer roller 225, and a drum cleaner 226. The photoconductor drum 221 is an image holder having a charge generation layer and a charge transportation layer and is rotated by a driving unit (not illustrated) in a direction indicated by an arrow D22 in FIG. 1. The charger 222 charges the surface of the photoconductor drum 221. The exposure device 223 includes a laser light source, a polygon mirror, and other components (each of which is not illustrated) and, under the control of the controller 11, radiates a laser beam onto the photoconductor drum 221 charged by the charger 222, in accordance with data representing an image. The photoconductor drum 221 thereby holds a latent image.

Note that the data representing the image includes the patch columns 121 and various image data pieces that are stored in the memory 12 but may be data acquired by the controller 11 from an external device through a communication unit (not illustrated). Examples of the external device include a reading device that reads the original image and a memory in which data representing an image is stored.

The developing device 224 contains a two-component developer having toner in the corresponding one of C, M, Y, and K and a magnetic carrier such as ferrite powder. Tip ends of a magnetic brush formed in the developing device 224 come in contact with the surface of the photoconductor drum 221, and thereby the toner attaches to a portion, of the surface of the photoconductor drum 221, on which the exposure device 223 performs light exposure, that is, attaches to a line portion of the electrostatic latent image. A toner image (image) is thus formed (developed) on the photoconductor drum 221.

Each first transfer roller 225 in the transfer unit 23 is used to generate a predetermined potential difference at a position where an intermediate transfer belt 231 faces the corresponding photoconductor drum 221. The potential difference causes the toner image (image) to be transferred onto the intermediate transfer belt 231. Each drum cleaner 226 removes the toner not transferred and remaining on the surface of the corresponding photoconductor drum 221 after the transfer of the toner image and discharges the surface of the photoconductor drum 221.

The transfer unit 23 includes the intermediate transfer belt 231, a second transfer roller 232, belt transportation rollers 233, a backup roller 234, and a belt cleaner 239. The transfer unit 23 transfers the toner images formed by the developing units 22 on the sheets P of a paper type determined in accordance with an operation by the user.

The intermediate transfer belt 231 is an endless belt member and stretched around the belt transportation rollers 233 and the backup roller 234. At least one of the belt transportation rollers 233 and the backup roller 234 includes a driving unit (not illustrated) to move the intermediate transfer belt 231 in a direction indicated by an arrow D23 in FIG. 1. A toner image formed on the intermediate transfer belt 231 due to transfer is thereby moved to a nip region formed by the second transfer roller 232 and the backup roller 234.

The second transfer roller 232 utilizes the potential difference from the intermediate transfer belt 231 to cause the toner image on the intermediate transfer belt 231 to be transferred onto one of the sheets P that is transported from the transporting unit 21. The belt cleaner 239 removes the toner not transferred and remaining on the surface of the intermediate transfer belt 231. The sheet P having the toner image transferred thereon is transported to the heating unit 24 by the transfer unit 23 or the transporting unit 21.

The heating unit 24 heats the toner image transferred on the sheet P to fix the toner image on the sheet P. The heating unit 24 includes a heating roller 241 and a pressure roller 242. The pressure roller 242 presses the sheet P transported by the transporting unit 21 against the heat emitting heating roller 241, while being rotated by a driving unit (rolling mechanism) (not illustrated). The pressure roller 242 thereby helps the heating roller 241 to heat the sheet P.

1-2. Functional Configuration of Determination Device

FIG. 2 is a diagram illustrating a functional configuration of the determination device 1 of the image forming system 9. The controller 11 of the determination device 1 executes the program stored in the memory 12 to thereby function as a first instructing unit 111, a first acquiring unit 112, a correcting unit 113, a converter 114, a predicting unit 115, a second instructing unit 116, a second acquiring unit 117, and a determining unit 118.

The first instructing unit 111 reads out the patch columns 121 from the memory 12 to instruct the output device 2 to output the patch columns 121. FIG. 3 is a diagram for explaining the patch columns 121. Each patch column 121 is a group of multiple patch images arranged one after another vertically in FIG. 3 (in a column direction). The patch column 121 has multiple single-color patch images each represented by single-color tone values and at least one multicolor patch image represented by multicolor tone values.

The tone values are signal values in data representing image content, each indicating a density level of a corresponding one of multiple primary colors. In this example, the tone values range from 0% to 100%.

The term "single-color tone values" denotes tone values of only one of multiple color components used by the output device 2 for forming an image. Since the output device 2 herein uses toner in four colors of cyan, magenta, yellow, and black when forming an image, such a patch image that has, for example, a tone value of 50% for yellow and a tone value of 0% for each of three components of cyan, magenta, and black is a single-color patch image.

The term "multicolor" is used for a color patch not in a single color. In other words, a multicolor patch image has tone values at least two of which are not 0% for the two respective colors.

The first instructing unit 111 instructs the output device 2 to sequentially output the patch columns 121. The patch columns 121 are arranged side by side horizontally in FIG. 3 (referred to as a row direction) on the sheet P. For example, each patch column 121 has n patch images composed of single-color patch images and at least one multicolor patch image, and m patch columns 121 are formed on one sheet P. The sheet P has thereby color standards 4 formed thereon, the color standards 4 being composed of patch images in m columns and n rows.

At the time of being output in accordance with the instruction given by the first instructing unit 111, the patch columns 121 have not yet undergone correction and conversion (described later). The yet-to-be corrected and converted patch columns 121 are referred to as first patch columns.

The user of the image forming system 9 operates the measurement device 3 to measure, every patch column 121, the toner densities of the color standards 4 output from the output device 2. The term "toner density" denotes the density of a toner image formed on a recording medium and is expressed using the intensity of reflected light, the toner weight per unit area, or the like.

The measurement device 3 includes a light emitting unit, a light receiving unit, and a computing unit. The light emitting unit radiates light onto an image on the sheet P, the light receiving unit receives the light reflected on the image, and the computing unit computes the toner density from the intensity of the received reflected light and outputs the toner density. The measurement device 3 is, for example, a colorimeter.

The user places a plate-shaped guide on the sheet P having the color standards 4 formed thereon and manually moves the measurement device 3 along the guide to measure the toner densities of the respective patch images in the color standards 4 every patch column 121. The measurement device 3 provides the determination device 1 with a measurement result through the operating unit 13.

The first acquiring unit 112 acquires measurement values of the respective single-color patch images as a result of the measurement performed in such a manner that the user operates the measurement device 3 along each first patch column output by the output device 2.

The correcting unit 113 corrects the tone values on a per color basis to make the measurement values of the single-color patch images acquired by the first acquiring unit 112 approach target values predetermined for the single-color patch images. Each tone value is corrected using the corresponding correction characteristic 122 identified from the acquired corresponding measurement value of the single-color patch image and the target value for the measurement value.

FIGS. 4A and 4B are a graph and a chart, respectively, for explaining the correction characteristics 122. The correction characteristics 122 are determined for the respective colors of cyan, magenta, yellow, and black to make output characteristics of the output device 2 approach predetermined target characteristics.

In FIG. 4A, the horizontal axis represents tone value, and the vertical axis represents density or tone value after correction (corrected tone value). As the density, a value relative to a predetermined density may be used, and thus a unit of the density is hereinafter omitted in the description.

The target characteristics predetermined on a per color basis each represent target values of the densities (target densities) of the tone values designated for the corresponding color of a toner image to be output by the output device 2. Each target characteristic is expressed using a table of correspondence between target densities and the tone values or using a function by which target densities are calculated using an independent variable for tone values. For example, FIG. 4A illustrates the target characteristic represented by a line Ct0 corresponding to a linear function using an independent variable for tone values. In the target characteristic, a tone value of 100% corresponds to the target density of 1.0, a tone value of 50% corresponds to the target density of 0.5, and a tone value of 0% corresponds to the target density of 0.

Meanwhile, suppose a case where there are multiple output devices 2. In such a case, even though the same tone values are designated, the density of a formed toner image might vary depending on the output device 2 because of different conditions including differences in manufacturing processes or in environmental factors such as the temperature and humidity in the area where the output device 2 is used. Hence, to identify the output characteristics of the output device 2, the user of the image forming system 9 operates the determination device 1 to cause the output device 2 to output the patch columns 121 and operates the measurement device 3 to measure the toner densities of the patch columns 121.

Each output characteristic represents a relation between tone values and measurement values of toner images output by the output device 2 by using the tone values. For the output characteristic, a correspondence table may be used in which multiple tone values designated for the output device 2 are associated, respectively, with measurement values of toner images output by the output device 2 by using the respective tone values.

Alternatively, a function representing a relation of the measurement values with the tone values may be used for the output characteristic. In the function, an independent variable x is used for the tone values designated for the output device 2, and a dependent variable y is used for the measurement values of the densities of toner images output using the tone values by the output device 2. In this case, the measurement device 3 provides the determination device 1 with parameters to be used for the identified function. The function may be obtained for the measurement device 3 in such a manner that interpolation is performed on points plotted on the graph by using the measured toner densities and the tone values corresponding to the respective toner densities. A curve Cm0 in FIG. 4A represents the output characteristic of the output device 2.

The user then identifies the correction characteristic 122 for the identified characteristic, the correction characteristic 122 being identified for correcting the tone values in such a manner that the identified output characteristic is made to approach the target characteristic. The user stores the correction characteristic 122 in the memory 12 of the determination device 1. A curve Cr in FIG. 4A represents the correction characteristic 122. The correction characteristic 122 represents a relation between tone values G0 of images output by the output device 2 and corrected tone values G1 after correction of the tone values G0 and is stored in the memory 12 by using a table such as a so-called "lookup table", for example, illustrated in FIG. 4B. The corrected tone values G1 obtained by correcting the tone values G0 are designated for the output device 2, and thereby the densities of toner images to be actually output by the output device 2 are made to approach the densities of the toner images to be output with respect to the tone values G0, that is, made to approach the target densities. In other words, the correction makes the curve Cm0 in FIG. 4A approach the line Ct0.

As described above, for a toner image having a single color, the output characteristic is made to approach the target characteristic in such a manner that the correcting unit 113 corrects one of the tone values G0 for the toner image to the corresponding corrected tone value G1. However, for a toner image having multiple colors, an intended toner image might not be obtained because combining multiple colors generally causes the colors to mutually influence each other. To control the influence exerted by combining multiple colors, the converter 114 converts multicolor tone values for forming an image into respectively associated tone values, by using the profile 123 set by the user.

The profile 123 defines a conversion rule for sets of multicolor tone values and is stored in the memory 12. FIG. 5 is a diagram for explaining the profile 123. The profile 123 illustrated in FIG. 5 has data pieces for converting a color space of an image into a color space of a color material used to form a toner image by the output device 2. The profile 123 includes pre-conversion data 1231 and post-conversion data 1232.

The pre-conversion data 1231 is obtained by quantizing a color space formed by data regarding an image and includes groups of data pieces of representative points included in a region requiring conversion in the color space. The post-conversion data 1232 includes groups of data pieces of points converted from the pre-conversion data 1231 in the color space for the output device 2. One profile 123 is defined using sets of data pieces in the pre-conversion data 1231 and data pieces in the post-conversion data 1232.

Among points in the color space indicated using the multicolor tone values of an image, the converter 114 converts points corresponding to data pieces included in the pre-conversion data 1231 of the profile 123 into associated points corresponding to data pieces in the post-conversion data 1232. To convert points corresponding to data pieces not included in the pre-conversion data 1231, the converter 114 performs interpolation on the points corresponding to data pieces included in the pre-conversion data 1231.

For example, when the profile 123 illustrated in FIG. 5 is applied, the converter 114 converts a tone value set of (C1, M1, Y1, and K1) into a tone value set of (C2, M2, Y2, K2) and converts a tone value set of (C3, M3, Y3, K3) into a tone value set of (C4, M4, Y4, K4).

Note that the profile 123 describes points included in a region requiring conversion in the color space as described above and thus does not describe points not to be converted.

In a case where any one of tone values of cyan, magenta, and yellow exceeds a corresponding predetermined value, the determination device 1 performs processing called a total amount control, for example, to restrict a total amount of color toner. In the total amount control, the determination device 1 subtracts the predetermined tone value from the corresponding one of the values of cyan, magenta, and yellow and adds a value corresponding to the subtraction result value to the tone value of black.

In a case where the tone value of one of the color components in a set of multicolor tone values of an image is distinguishably higher than tone values of the other color components, the determination device 1 performs processing called a pure color guarantee in which only one color component is used to represent the image. In a case where a region in the color space is to undergo the total amount control or the pure color guarantee, the profile 123 is not used for the region. In such a case, the determination device 1 separately performs exception handling.

Note that the multicolor patch images in the first patch columns may each have tone values for which the total of the tone values of the respective colors is predetermined as, for example, 50% or less. In a case where the total amount control is applied to a multicolor patch image, and in a case where the total of the tone values of the respective colors of the multicolor patch image is equal to or lower than predetermined value for the total amount control, it is guaranteed that the total amount control is not performed on the multicolor patch image and is thus applicable to the profile 123.

In a case where the converter 114 converts the tone values in the patch columns 121 after the correcting unit 113 corrects the tone values, the patch columns 121 obtained as a result of the conversion are referred to as second patch columns. In a case where the output device 2 is to output the second patch columns obtained as the result of the conversion by the converter 114 after the correcting unit 113 corrects the tone values in the first patch columns, the predicting unit 115 predicts measurement values of multicolor patch images included in the second patch columns to be output.

For example, suppose a case where the correcting unit 113 corrects tone values of C1 for cyan, M1 for magenta, Y1 for yellow, and K1 for black in one of the first patch columns to C3, M3, Y3, and K3, respectively. In this case, the correcting unit 113 corrects a tone value set of (C1, M1, Y1, and K1) to a tone value set of (C3, M3, Y3, and K3). Accordingly, the converter 114 using the profile 123 illustrated in FIG. 5 converts the tone value set of (C3, M3, Y3, and K3) into a tone value set of (C4, M4, Y4, and K4), not into a tone value set of (C2, M2, Y2, and K2). The conversion causes the first patch column to be changed into the second patch column.

In this example, the predicting unit 115 predicts measurement values of a multicolor patch image having the tone value set of (C4, M4, Y4, and K4) in the second patch column as measurement values corresponding to a multicolor patch image having the tone value set of (C1, M1, Y1, and K1) in the first patch column.

The second instructing unit 116 instructs the output device 2 to output the second patch columns. The output device 2 outputs the second patch columns in response to the instruction.

The second acquiring unit 117 acquires measurement values of the multicolor patch images measured in such a manner that the user operates the measurement device 3 along the second patch columns output by the output device 2.

The determining unit 118 determines whether an operation performed by the user and the profile 123 set by the user are appropriate on the basis of the measurement values acquired by the second acquiring unit 117 and the measurement values predicted by the predicting unit 115. For example, in a case where a difference between a measurement value acquired by the second acquiring unit 117 and a corresponding measurement value predicted by the predicting unit 115 exceeds a predetermined threshold, the determining unit 118 determines that either the operation performed by the user on the measurement device 3 at the time of measuring the toner densities of the color standards 4 or setting of the profile 123 selected by the user is inappropriate. A result of the determination performed by the determining unit 118 is provided to the display 14.

1-3. Operation of Determination Device

FIGS. 6A and 6B are flowcharts each for explaining operation of the determination device 1. The flowchart in FIG. 6A illustrates operations performed at the stage of preparing the correction and conversion, and the flowchart in FIG. 6B illustrates operations performed at the stage of checking the correction and conversion.

The controller 11 of the determination device 1 instructs the output device 2 to output the first patch columns (Step S101). The output device 2 outputs the first patch columns in response to the instruction, and the user measures toner densities of the output first patch columns by using the measurement device 3. The controller 11 acquires the measurement values of the first patch columns (Step S102).

The controller 11 generates the correction characteristics 122 on the basis of the acquired measurement values and the target values of the first patch columns (Step S103). The first patch columns are corrected using the correction characteristics 122, and prediction is performed of measurement values to be obtained when the toner densities of the multicolor patch images included in the second patch columns are measured by using the measurement device 3, the second patch columns being obtained by converting tone values by using the profile 123 set by the user (Step S104).

Next, the controller 11 actually corrects the first patch columns in accordance with the correction characteristics 122 (Step S201), performs conversion in accordance with the profile 123 (Step S202), acquires the second patch columns, and instructs the output device 2 to output the acquired second patch columns (Step S203).

The output device 2 outputs the second patch columns in response to the instruction, and the user measures the toner densities of the output second patch columns by using the measurement device 3. The controller 11 then acquires the measurement values of the second patch columns (Step S204).

The controller 11 compares the measurement values predicted in Step S104 with the measurement values acquired in Step S204 and determines whether the operation performed by the user and the profile 123 set by the user are appropriate on the basis of a comparison result (Step S205). A result of the determination in Step S205 is sent to the display 14 and is displayed by the display 14 to be notified to the user (Step S206).

As described above, based on the measurement values of the corrected and converted patch images, the determination device 1 determines whether the operation performed by the user for correcting the tone values of the images and the profile set by the user to be used for converting the tone values are appropriate.

2. Modification

The exemplary embodiment has been described above. The exemplary embodiment may be modified as follows, and the following modifications may be combined.

2-1. Modification 1

In the exemplary embodiment described above, each patch column 121 includes multiple single-color patch images each represented by single-color tone values and at least one multicolor patch image represented by multicolor tone values. However, the patch column 121 may include two or more multicolor patch images that are not arranged in series.

Suppose a case where the user measures the toner densities of the patch images every patch column 121 while manually moving the measurement device 3 in the column direction in FIG. 3. Even though the guide is placed along the patch column 121, radiated light might be spilled beyond the patch column 121 and enter the next patch column 121, or the measurement device 3 might be off the sheet P and cause variation in focused position. A manual operation might cause an operation mistake as described above. In addition, before one multicolor patch image per patch column 121 is measured, an operation mistake might have occurred. Accordingly, the use of one multicolor patch image per patch column 121 for determination leads to limited determination reliability. The use of two or more multicolor patch images enables a so-called "double-check", thus leading to higher reliability in determination performed by the determination device 1 than in the case of using one multicolor patch image.

If the two or more multicolor patch images used for the determination are not arranged in series, the determination performed on at least one single-color patch image between the multicolor patch images has enhanced reliability. In other words, if the user operation performed on the two multicolor patch images disposed across the single-color patch image is not inappropriate, the measurement device 3 is less likely to deviate from the intended course at least when the single-color patch image disposed between the multicolor patch images is measured. Accordingly, the determination performed on the single-color patch image has enhanced reliability.

2-2. Modification 2

The determination device 1 is incorporated in the output device 2 in the image forming system 9 illustrated in FIG. 1 but does not have to be incorporated in the output device 2. For example, the determination device 1 may be a mobile phone wirelessly connected to the output device 2 or a terminal device such as a slate computer.

2-3. Modification 3

In the exemplary embodiment described above, the converter 114 uses the profile 123 set by the user to convert the multicolor tone values forming an image into the associated tone values, but the profile 123 may be a profile that is not set by the user. The converter 114 may also convert the tone values in accordance with, for example, a predetermined formula or a rule, instead of using the profile 123. In addition, the determination device 1 does not have to control the influence exerted by combining multiple colors. In this case, the controller 11 does not have to function as the converter 114. Moreover, the predicting unit 115 only has to predict measurement values of multicolor patch images included in the second patch columns obtained after the correcting unit 113 corrects the tone values in the first patch columns.

2-4. Modification 4

The program run by the controller 11 of the determination device 1 may be provided in such a manner as to be stored in a computer readable recording medium, for example, a magnetic recording medium such as a magnetic disk or a magnetic tape, an optical recording medium such as an optical disk, a magneto-optical recording medium, or a semiconductor memory. The program may be downloaded through the Internet. Note that various devices in addition to the CPU are applicable to a controller exemplified by the aforementioned controller 11 in some cases, and, for example, a dedicated processor or the like is used.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A determination device comprising:
a first instructing unit that instructs an image output device to output a first patch column in which a plurality of single-color patch images and at least one multicolor patch image are arranged, the plurality of single-color patch images being represented by respective tone values for single colors, the one multicolor patch image being represented by a tone value of a multicolor;
a first acquiring unit that acquires measurement values of the plurality of single-color patch images measured by a user by operating a measurement device along a first patch column output by the image output device;
a correcting unit that corrects the tone values on a per color basis such that the measurement values, of the plurality of single-color patch images acquired by the first acquiring unit are made to approach target values predetermined for the single-color patch images;
a predicting unit that predicts a measurement value of the multicolor patch image included in a second patch column to be output by the image output device, the second patch column being acquired after the correcting unit corrects the tone values in the first patch column;
a second instructing unit that instructs the image output device to output the second patch column;
a second acquiring unit that acquires the measurement value of the multicolor patch image measured by performing, by the user, an operation of the measurement device along the second patch column output by the image output device; and a determining unit that determines whether the operation performed by the user is appropriate on a basis of the measurement value acquired by the second acquiring unit and the measurement value predicted by the predicting unit.

2. The determination device according to claim 1, wherein the first patch column includes at least two of the multicolor patch images that are not arranged in series.

3. The determination device according to claim 1, wherein a total of tone values of colors of the multicolor patch image is about 50% or less.

4. The determination device according to claim 2, wherein a total of tone values of colors of the multicolor patch image is about 50% or less.

5. A determination method comprising:

instructing an image output device to output a first patch column in which a plurality of single-color patch images and at least one multicolor patch image are arranged, the plurality of single-color patch images being represented by respective tone values for single colors, the multicolor patch image being represented by a tone value of a multicolor;

acquiring measurement values of the plurality of single-color patch images measured by a user by operating a measurement device along a first patch column output by the image output device;

correcting the tone values on a per color basis such that the measurement values of the plurality of single-color patch images acquired in the acquiring of the measurement values of the plurality of single-color patch images are made to approach target values predetermined for the single-color patch images;

predicting a measurement value of the multicolor patch image included in a second patch column to be output by the image output device, the second patch column being acquired after the tone values in the first patch column is corrected in the correcting;

instructing the image output device to output the second patch column;

acquiring the measurement value of the multicolor patch image measured by performing, by the user, an operation of the measurement device along the second patch column output by the image output device; and determining whether the operation performed by the user is appropriate on a basis of the measurement value acquired in the acquiring of the measurement value of the multicolor patch image and the measurement value predicted in the predicting.

\* \* \* \* \*